Aug. 15, 1950  T. CARROLL  2,518,521
FLOATING AUGER CONVEYER FOR GRAIN CUTTERS
Filed Dec. 26, 1947  2 Sheets-Sheet 1

INVENTOR.
THOMAS CARROLL
BY A.S.Krol
ATTORNEY

Aug. 15, 1950 — T. CARROLL — 2,518,521
FLOATING AUGER CONVEYER FOR GRAIN CUTTERS
Filed Dec. 26, 1947 — 2 Sheets-Sheet 2
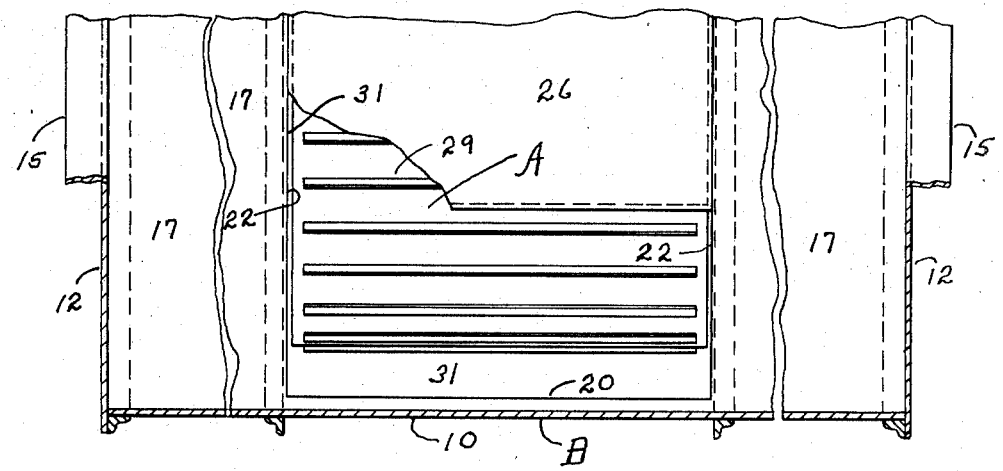
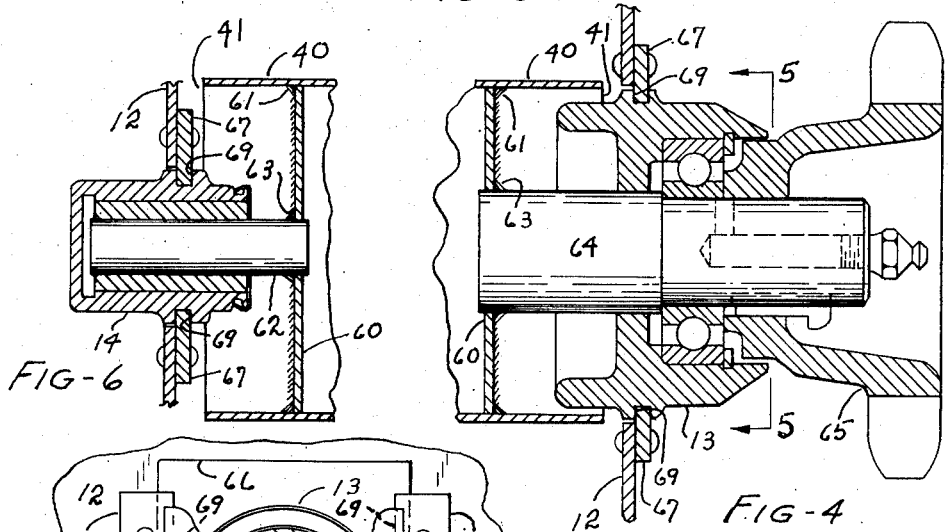
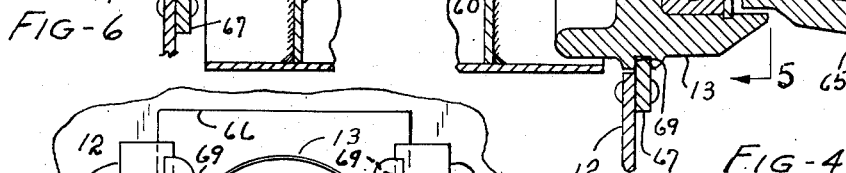
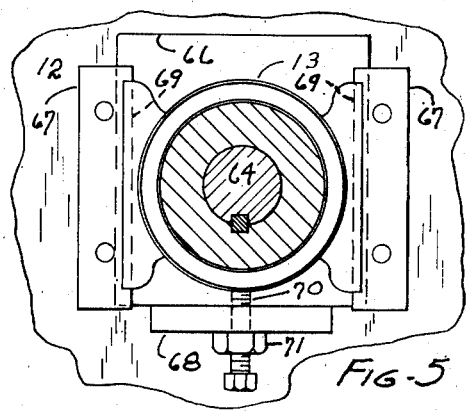
INVENTOR.
THOMAS CARROLL
BY
ATTORNEY Patented Aug. 15, 1950

2,518,521

UNITED STATES PATENT OFFICE 2,518,521

FLOATING AUGER CONVEYER FOR GRAIN CUTTERS

Thomas Carroll, Toronto, Ontario, Canada, assignor to Massey-Harris Co. Ltd., Toronto, Ontario, Canada, a corporation of Canada Application December 26, 1947, Serial No. 793,824

1 Claim. (Cl. 56—153)

The present invention relates to auger conveyors for combines, one design of which is shown in my issued Patent #2,426,922, September 2, 1947.

The present invention comprises means for adjusting the auger to a desired minimum height relative to the trough or platform and also means whereby the auger is free to raise vertically or float over an excessive or unexpected bulk of grain, thus to prevent excessive strain on the auger and its driving mechanism.

The principal objects of my invention are to provide an adjustment whereby the operator can adjust the minimum height of the auger to correspond with the stand of grain to be harvested and also provide a floating auger which will respond to sudden and unexpected bulk of grain.

A further object of the present invention is to make it possible to adjust the height of the auger to a light crop and at the same time provide the floating means for eventualities.

In the present invention means are provided whereby the auger can be adjusted close enough to the trough to successfully and continuously feed the grain of a very light stand and at the same time protect the device against spots in the field of heavy grain.

In the present invention the weight of the auger is sufficient to cause the auger to handle either the heaviest or lightest stand of grain. Thus my floating auger is at all times automatic in its action.

To these and other useful ends my invention consists of parts, combinations of parts or their equivalents and mode of operation, as hereinafter described and claimed and shown in the accompanying drawings in which:

Fig. 3 is a view similar to Figure 1 but taken on lines 3—3 of Figure 2.

Fig. 4 illustrates the preferred form of bearing for the driver end of the auger and sectioned on a horizontal line showing a fraction of the main auger shaft.

Fig. 5 is an end section taken on line 5—5 of Figure 4.

Fig. 6 is a horizontal section of the preferred form of bearing for the other end of the auger showing a fraction of the main auger shaft.

Figure 1:
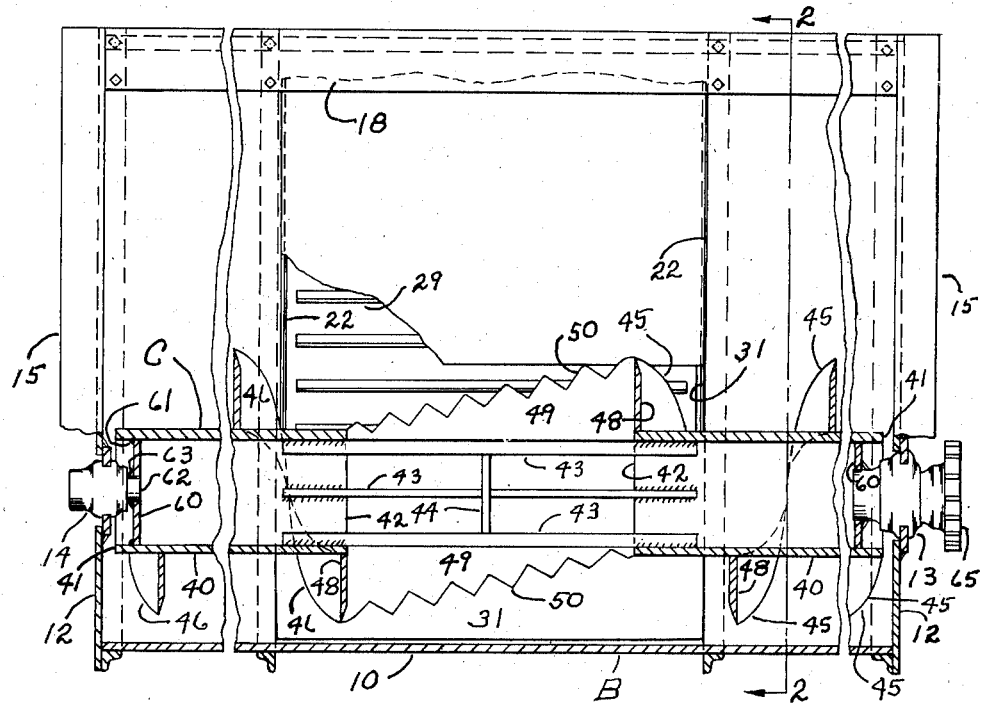
Fig. 1 is a front elevational view of my device with portions cut away on opposite sides of the elevator and taken on lines 1—1 of Figure 2.

As thus illustrated the preferred form of elevator used with my improved auger conveyor is designated in its entirety by reference character A. The platform and its rigidly connected parts in its entirety is designated by reference character B. The auger in its entirety is designated by reference character C.

Platform B has a trough 10 and has secured to its front edge a cutter bar 11, the ends of the trough being closed by plates 12—12 upon which bearings 13 and 14 are mounted in a manner as will hereinafter appear. Members 12 have at their upper edges flanges 15—15 which at their lower front ends intersect the usual gathering plates 16. A rear end plate 17 is secured to the rear edge of trough 10 and to plates 12 and extends preferably vertically terminating in a forwardly extending shield member 18, this shield member acting to stiffen the upper edge of member 17 and prevent grain from passing rearwardly over the plate. Member 17 is provided with an outlet opening 31 preferably intermediate at its ends, which extends from the trough as at 20 to a point 21, the ends of the opening being preferably as at 22—22.

Elevator A has side plates 23—23 which are connected together at their bottoms by a plate 24 which intersects the bottom of the opening in plate 17. Member A is provided with a cover 25 which extends through the outlet opening 31 in plate 17 and preferably curving forward and downward as at 26. The elevator has an upper shaft 27 and a lower shaft 28 each of these shafts having sprockets or drums adapted to carry the endless elevator belt 29.

Shaft 27 is preferably rotatably mounted in members 23 and may act as a driver for the underpass elevator, having suitable sprockets for the purpose. Shaft 28 may extend through plates 23 in which case slots 30 are provided so the forward end of elevator 29 may yieldingly contact the grain as it enters the elevator, thus to insure against clogging of the grain in the outlet opening 31 in member 17.

Thus I have described briefly the preferred form of elevator used with my auger table and will now describe my improved floating auger C.

Auger C comprises preferably two large tubes 40—40 which terminate at their outer ends as at 41—41, their inner ends terminating preferably past the ends of outlet opening 31 as at 42—42 and being connected together by means of preferably four bars 43, the bars being welded to the inner surface of the tubes as indicated in Figure 1.

Midway the ends of members 43 I provide a disc 44 which is welded thereto, thus to add strength to the assembly. On each tube 40 I mount oppositely turned augers 45 and 46 adapted to move the grain toward outlet opening 31, the augers terminating at their inner ends as at 48—48 or a short distance past the ends of outlet opening 31 and on opposite sides of members 40.

To the ends of each auger 45 and 46 and on bars 43, I secure plates 49—49 which are gradually reduced in width in opposite directions as shown and having preferably notches as at 59 which are adapted to effectively engage the grain; thus the grain will be delivered from opposite ends of the table in bundles into outlet opening 31 and in bundles somewhat shorter than the length of the outlet opening.

Auger C design is very similar to my pending application Serial Number 732,705, filed March 6, 1947, now Patent 2,464,919 issued March 22, 1949, in which the grain is handled in a similar manner to the present design.

I will now describe the mounting of the auger which provides for the adjusting and yielding principle as outlined in the preamble of this specification. In the drawings I have shown a preferred form of auger however, clearly, any other design of an auger may be used with my invention.

Members 40 are relatively large tubes each having near their outer ends a disc 60 which is welded to the tube as at 61. Left hand disc 60 has a bearing shaft 62 which is welded thereto as at 63. Shaft 62 is journaled in bearing 14 (see Figure 6). Another shaft 64 is secured to the right hand disc 60 by welding as at 63. Shaft 64 extends through bearing 13 (see Figure 4) and has mounted on its outer end a sprocket 65 which answers as a driver for the auger assembly.

Figure 2:
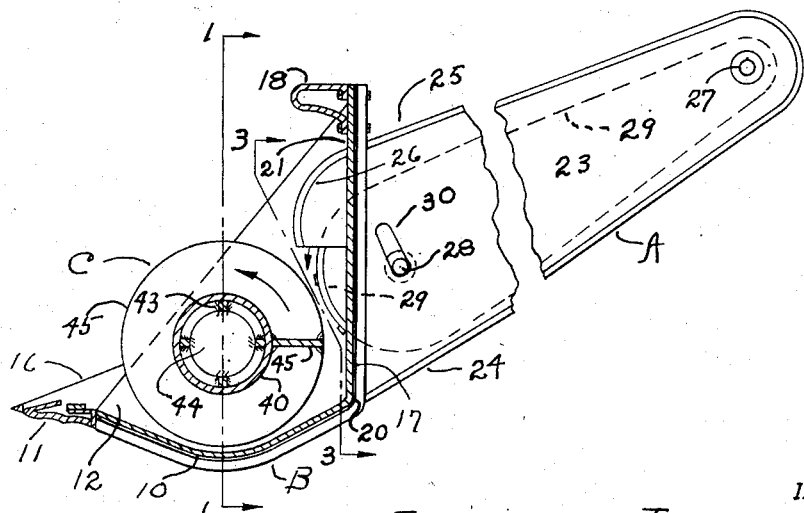
Fig. 2 is an end view of my improved device showing the elevator with a fraction cut away and taken on line 2—2 of Figure 1.

Each member 12 has a vertically positioned elongated rectangular opening 66 with bars 67—67 on opposite sides thereof, which are secured to the plates. Other bars 68 are secured to the plates at the bottom of the opening as illustrated. Bearings 13 and 14 on their forward and rear sides are provided with grooves 69—69 which are adapted to loosely and slidably embrace members 67. Members 68 are each provided with a threaded bolt 70 having a lock nut 71. Bearings 13 and 14 in their lowest position may rest on members 68 at which time members 45 and 46 are very close to member 10 (see Figure 2). This lowest position of the auger unit may be successfully used for the very lightest yield of grain. For heavier yields bolt 70 is used for raising the bearings.

Openings 66 are long enough vertically so when the bearings are adjusted for the heaviest yield they will be free to raise a considerable distance vertically. Thus in addition to the adjustment provided for heavy and light grain, either or both ends of the auger conveyor will be permitted to raise above the adjustment for moving over an excessive amount or large bulk of grain, thus to protect the device against injury and provide, what I term, a floating auger.

Thus it will be seen that I have provided a floating auger which is very simple, easily manufactured at low cost, safe and efficient.

Clearly many minor detail changes may be made in the design shown without departing from the spirit and scope of my invention as recited in the appended claim.

Having thus shown and described my invention, I claim:

A grain cutting and conveying device of the character described comprising in combination, a trough having a cutter bar secured to its forward edge and a substantially, vertically extending rear plate secured to its rear edge, a grain outlet in said rear plate positioned intermediate the ends thereof, and extending vertically a considerable distance from the trough, sheet metal plates secured to the ends of said trough and vertically arranged plates for an enclosure for the trough and plates, vertically extending elongated openings cut from said end plates, an auger conveyor having end shaft and bearings thereon, which are positioned within said elongated openings, said bearings having on the front and rear sides vertically arranged grooves positioned substantially in alignment with said enclosures, vertically positioned, relatively thin bars secured to the front and rear sides of said elongated openings and being engaged by said grooves whereby said bearings are free to move vertically a considerable distance, other bars secured to the end closure plates at the bottom of said elongated openings, each having screw threaded means adapted to contact the bottom of said bearings and determine the vertical position thereof, the openings in said enclosures being long enough to permit vertical adjustment of the bearings and permit further vertical movement thereof, said other bars being positioned whereby when said bearings are adjusted to their lowest positions, the auger conveyor will not contact said trough.

THOMAS CARROLL.

REFERENCES CITED

The following references are of record in the file of this patent:

UNITED STATES PATENTS

| Number | Name | Date |
|---|---|---|
| 503,526 | Burgroff | Aug. 15, 1893 |
| 1,079,876 | Pearson | Nov. 25, 1913 |
| 1,959,689 | Ronning | May 22, 1934 |
| 2,426,922 | Carroll | Sept. 2, 1947 |